US011898512B1

(12) United States Patent
Zhang et al.

(10) Patent No.: US 11,898,512 B1
(45) Date of Patent: Feb. 13, 2024

(54) METHODS AND SYSTEM FOR ENGINE COLD STARTING

(71) Applicant: Ford Global Technologies, LLC, Dearborn, MI (US)

(72) Inventors: Xiaogang Zhang, Novi, MI (US); Steven Wooldridge, Manchester, MI (US); Gary Coulson, Ypsilanti, MI (US); David Bruce Reiche, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/168,816

(22) Filed: Feb. 14, 2023

(51) Int. Cl.

| | |
|---|---|
| ***F02D 41/06*** | (2006.01) |
| ***F02D 13/02*** | (2006.01) |
| ***F02D 41/40*** | (2006.01) |
| ***F02P 5/15*** | (2006.01) |
| *F02D 41/38* | (2006.01) |

(52) U.S. Cl.
CPC ....... *F02D 41/064* (2013.01); *F02D 13/0249* (2013.01); *F02D 41/402* (2013.01); *F02P 5/1506* (2013.01); *F02D 2041/389* (2013.01); *F02D 2200/021* (2013.01)

(58) Field of Classification Search
CPC .. F02D 41/064; F02D 13/0249; F02D 41/402; F02D 2041/389; F02D 2200/021; F02P 5/1506
See application file for complete search history.

(56) References Cited

U.S. PATENT DOCUMENTS

| | | | | |
|---|---|---|---|---|
| 9,394,834 | B2 * | 7/2016 | Yacoub | F02D 41/1446 |
| 10,100,767 | B2 * | 10/2018 | Liu | F02D 41/064 |
| 10,704,482 | B2 * | 7/2020 | Dudar | F02N 19/00 |
| 10,844,775 | B2 * | 11/2020 | Kelly | F01N 3/0236 |
| 10,968,879 | B2 * | 4/2021 | Pursifull | F02D 37/02 |
| 10,975,789 | B2 * | 4/2021 | Martz | F02B 29/0418 |
| 11,066,976 | B2 * | 7/2021 | Kurtz | F02D 29/02 |
| 2018/0010548 | A1 * | 1/2018 | Hoshi | F02D 41/0245 |
| 2020/0232325 | A1 * | 7/2020 | Nakamura | F02B 75/045 |

* cited by examiner

*Primary Examiner* — Sizo B Vilakazi
(74) *Attorney, Agent, or Firm* — Vincent Mastrogiacomo; McCoy Russell LLP

(57) ABSTRACT

Systems and methods for cold starting an internal combustion engine are described. In one example, fuel is delivered in four equal amounts into a cylinder during a cycle of the cylinder. The fuel is injected so as to reduce cylinder wall wetting, raise combustion stability, and increase exhaust system heating.

20 Claims, 4 Drawing Sheets

METHODS AND SYSTEM FOR ENGINE COLD STARTING

FIELD

The present description relates to methods and a system for starting an internal combustion engine.

BACKGROUND AND SUMMARY

Cold starting emissions for an internal combustion engine may comprise more than one third of engine emissions. Attempts to reduce engine emissions during cold starting have lowered engine emissions, but tailpipe emissions remain stubbornly high. Reasons that tailpipe emissions remain higher than desired may include but are not limited to fuel wetting of cylinder walls during engine cranking, less thermal energy from injected fuel is converted into heating energy for the catalyst than may be desired, and engine feed gases are converted less efficiently than may be desired. Cold start engine emissions may be difficult to lower because the engine's catalyst is not at a threshold operating temperature when the engine is cold started. As a result, the catalyst may not convert a high percentage of engine exhaust gases when the catalyst is below the threshold temperature. To lower tailpipe emissions during a cold engine start, these issues may have to be at least partially overcome.

The inventors herein have recognized the above-mentioned issues and have developed a method for operating an engine, comprising: via a controller, injecting fuel at least three times during a cycle of a cylinder, where two of the at least three times are during an expansion stroke of the cylinder; and via the controller, initiating a spark in the cylinder between the two of the at least three times.

By injecting fuel to a cylinder at least three times during a cycle of a cylinder and initiating a spark in the cylinder between the last two fuel injections during the cylinder cycle, it may be to provide the technical result of combusting fuel in the cylinder such that the cylinder exhibits substantially zero indicated mean effective pressure and imparts more energy to catalyst heating and less energy to rotating and heating the engine. Further, the fuel injection and spark timing may provide less fuel wetting of the cylinder and the piston in the cylinder, thereby reducing hydrocarbon emissions from the engine.

The present description may provide several advantages. In particular, the approach may lower an amount of time for a catalyst to reach a light off temperature. Further, the approach may reduce engine out emissions during engine cold starting. Additionally, the approach may raise combustion stability during engine cold starting.

The above advantages and other advantages, and features of the present description will be readily apparent from the following Detailed Description when taken alone or in connection with the accompanying drawings.

The summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
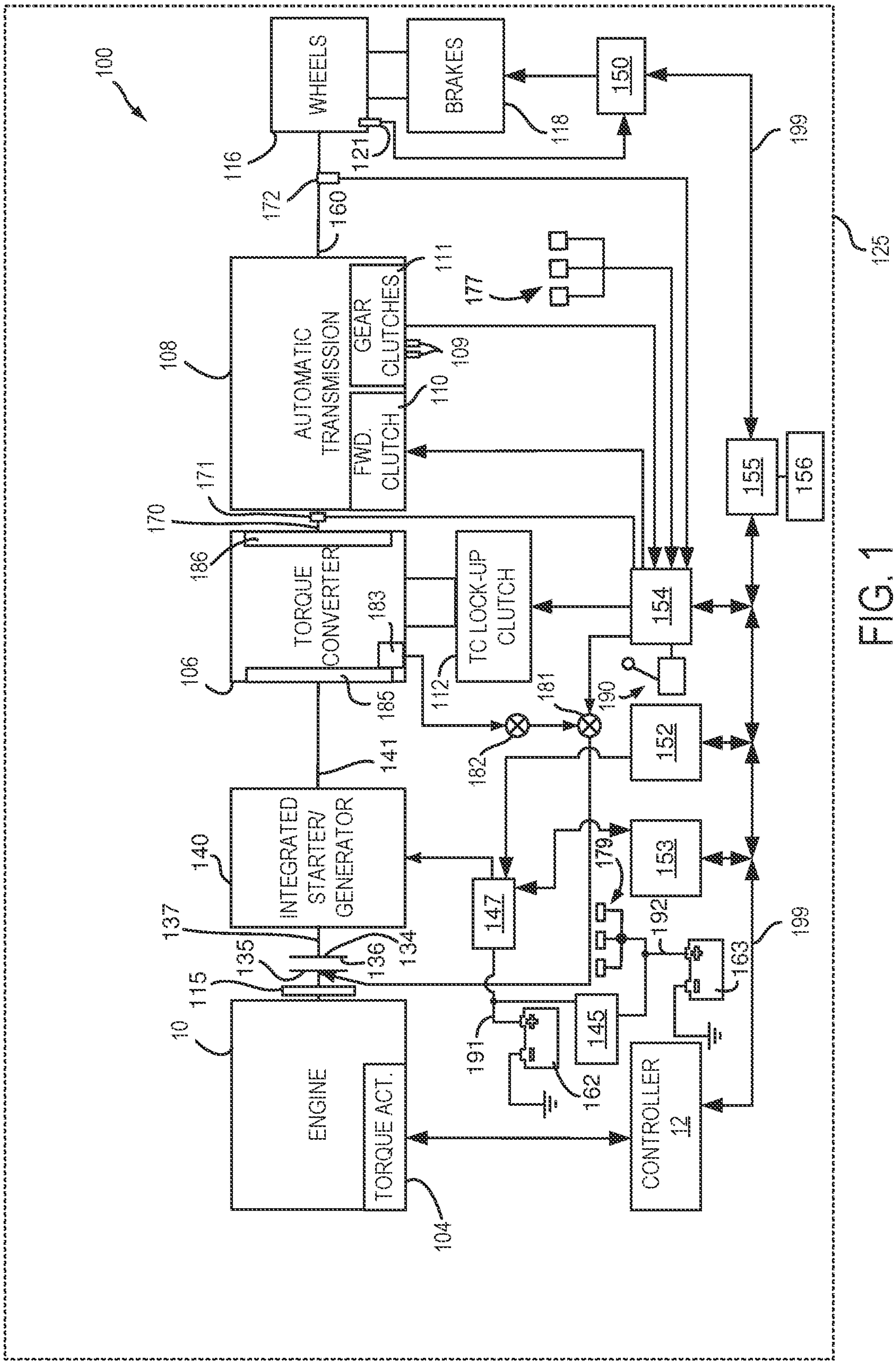
FIG. 1 is a schematic diagram of a hybrid vehicle driveline.
Figure 2:
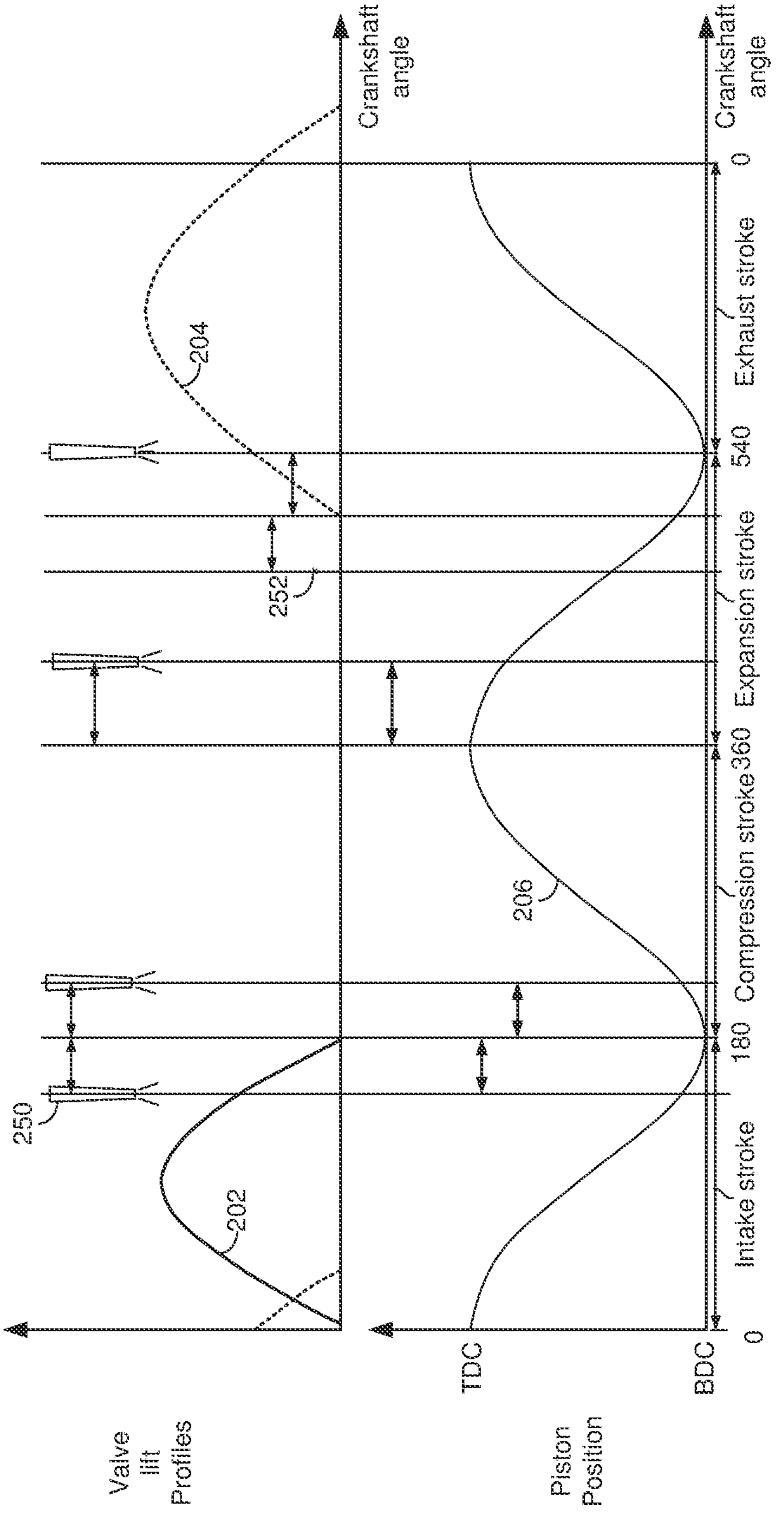
FIG. 2 shows an example of engine operation during engine cold starting.
Figure 3:
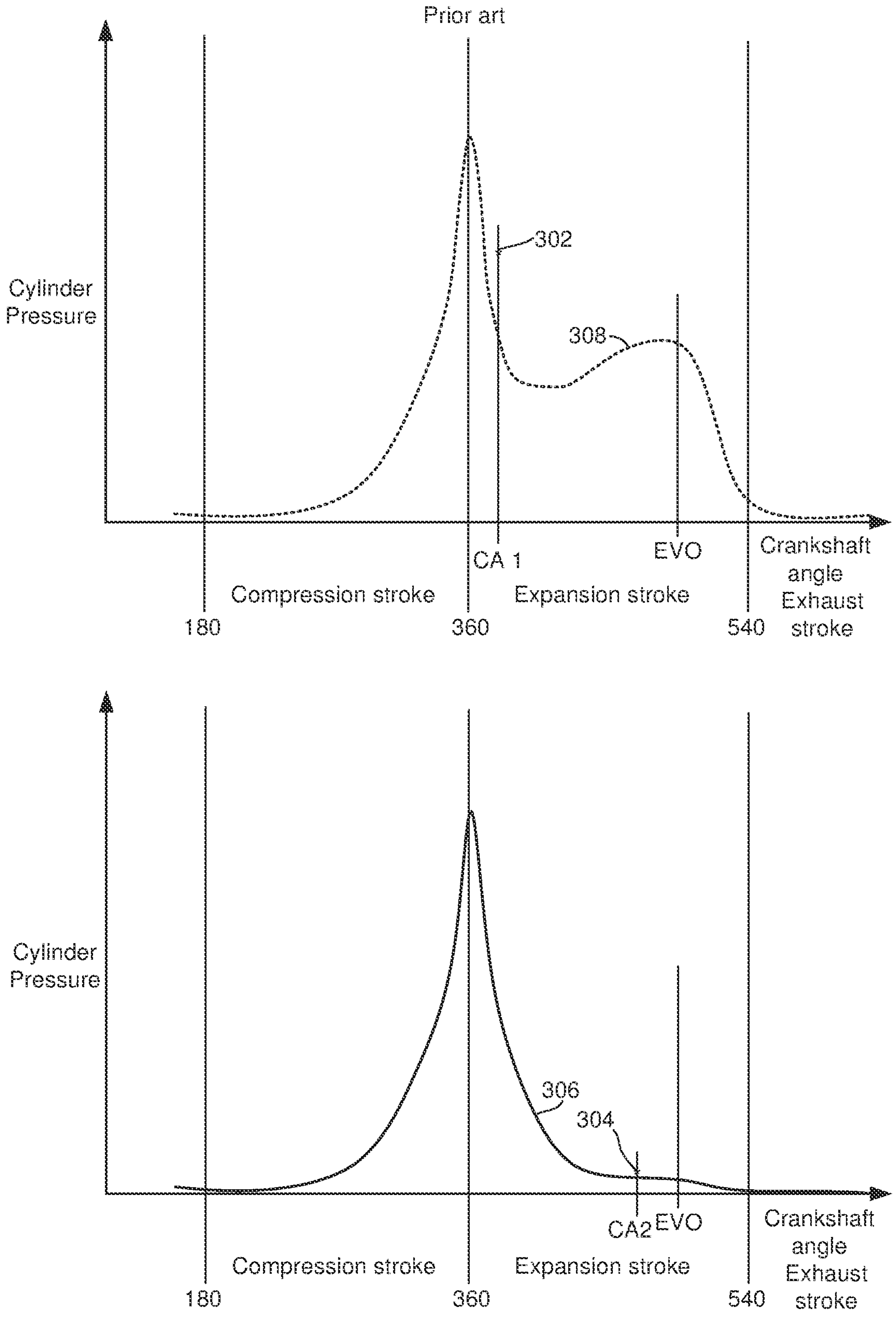
FIG. 3 shows plots of cylinder pressures during engine cold starting.
Figure 4:
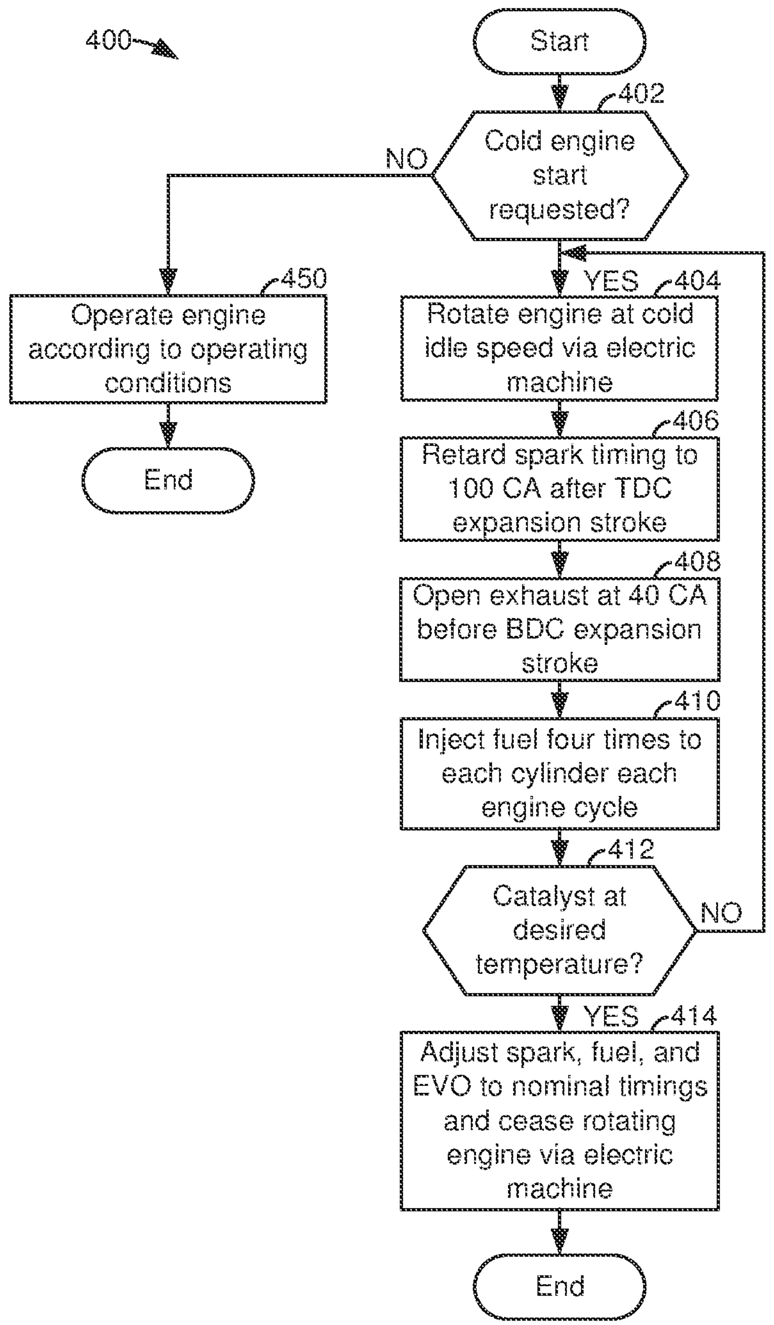
FIG. 4 shows a flowchart of a method for operating an engine during engine cold starting.

The present description is related to operating an internal combustion engine during engine cold starting. The methods and systems described herein may lower engine out emissions and tailpipe emissions. The methods and systems seek to lower an amount of time it takes for a catalyst to reach a threshold temperature (e.g., a catalyst light off temperature). Further, the methods and systems may reduce engine hydrocarbon emissions during engine cold starting. An example of a non-limiting vehicle driveline is shown in FIG. 1. FIG. 2 shows states of parameters of interest during engine cold starting. FIG. 3 shows plots of cylinder pressure during engine cold starting. Finally, a flowchart of a method for operating an engine is shown in FIG. 4.

FIG. 1 is a block diagram of a vehicle 125 including a powertrain or driveline 100. The powertrain of FIG. 1 includes an engine 10. Driveline 100 is shown including vehicle system controller 155, controller 12, electric machine controller 152, transmission controller 154, energy storage device controller 153, and brake controller 150. The controllers may communicate over controller area network (CAN) 199. In addition, vehicle system controller 155 may communicate with communications system 156 (e.g., a transceiver) so that vehicle 125 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 155 may provide commands to controller 12, electric machine controller 152, transmission controller 154, and brake controller 150 to achieve driver input requests and other requests that are based on vehicle operating conditions.

For example, in response to a driver (human or autonomous) releasing a driver demand pedal and vehicle speed, vehicle system controller 155 may request a desired wheel power or a wheel power level to provide a desired rate of vehicle speed reduction. The requested desired wheel power may be provided by vehicle system controller 155 requesting a first braking power from electric machine controller 152 and a second braking power from controller 12, the first and second powers providing a desired driveline braking power at vehicle wheels 116. Vehicle system controller 155 may also request a friction braking power via brake controller 150. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 1. For example, a single controller may take the place of vehicle system controller 155, controller 12, electric machine controller 152, transmission controller 154, and brake controller 150. Alternatively, the vehicle system controller 155 and the controller 12 may be a single unit while the electric machine controller 152, the transmission controller 154, and the brake controller 150 are standalone controllers.

In this example, driveline 100 may be powered by engine 10 and electric machine 140. In other examples, engine 10 may be omitted. Engine 10 may be started with an engine starting system shown in FIG. 1 or via electric machine 140 also known as an integrated starter/generator (ISG). Further, power of engine 10 may be adjusted via power actuator 104, such as a fuel injector, throttle, etc.

Driveline 100 is shown to include an electric energy storage device 162. Electric energy storage device 162 may output a higher voltage (e.g., 48 volts) than electric energy storage device 163 (e.g., 12 volts). DC/DC converter 145 may allow exchange of electrical energy between high voltage bus 191 and low voltage bus 192. High voltage bus 191 is electrically coupled to higher voltage electric energy storage device 162. Low voltage bus 192 is electrically coupled to lower voltage electric energy storage device 163 and sensors/actuators/accessories 179. Sensors/actuators/accessories 179 may include but are not limited to front and rear windshield resistive heaters, vacuum pumps, climate control fans, and lights. Inverter 147 converts DC power to AC power and vice-versa to enable power to be transferred between electric machine 140 and electric energy storage device 162.

An engine output power may be transmitted to an input or first side of driveline disconnect clutch 135 through dual mass flywheel 115. Driveline disconnect clutch 136 may be hydraulically actuated via fluid (e.g., oil) that is pressurized via pump 183. A position of valve 182 (e.g., line pressure control valve) may be modulated to control a pressure (e.g., a line pressure) of fluid that may be supplied to driveline disconnect clutch pressure control valve 181. A position of valve 181 may be modulated to control a pressure of fluid that is supplied to driveline disconnect clutch 135. The downstream or second side 134 of driveline disconnect clutch 136 is shown mechanically coupled to electric machine input shaft 137.

Electric machine 140 may be operated to provide power to driveline 100 or to convert powertrain power into electrical energy to be stored in electric energy storage device 162 in a regeneration mode. Electric machine 140 is in electrical communication with electric energy storage device 162. Further, electric machine 140 directly drives driveline 100 or is directly driven by driveline 100. There are no belts, gears, or chains to couple electric machine 140 to driveline 100. Rather, electric machine 140 rotates at the same rate as driveline 100. Electric energy storage device 162 (e.g., high voltage battery or power source, which may be referred to as a traction battery) may be a battery, capacitor, or inductor. The downstream side of electric machine 140 is mechanically coupled to the impeller 185 of torque converter 106 via shaft 141. The upstream side of the electric machine 140 is mechanically coupled to the driveline disconnect clutch 136. Electric machine 140 may provide a positive power or a negative power to driveline 100 via operating as a motor or generator as instructed by electric machine controller 152.

Torque converter 106 includes a turbine 186 to output power to input shaft 170. Input shaft 170 mechanically couples torque converter 106 to automatic transmission 108. Torque converter 106 also includes a torque converter lock-up clutch 112. Power is directly transferred from impeller 185 to turbine 186 when the torque converter lock-up clutch 112 is locked. Torque converter lock-up clutch 112 is electrically operated by transmission controller 154. Alternatively, torque converter lock-up clutch 112 may be hydraulically locked. In one example, the torque converter may be referred to as a component of the transmission.

When torque converter lock-up clutch 112 is fully disengaged, torque converter 106 transmits engine power to automatic transmission 108 via fluid transfer between the torque converter turbine 286 and torque converter impeller 185, thereby enabling torque multiplication. In contrast, when torque converter lock-up clutch 112 is fully engaged, the engine output power is directly transferred via the torque converter clutch to an input shaft 170 of automatic transmission 108. Alternatively, the torque converter lock-up clutch 112 may be partially engaged, thereby enabling the amount of power directly transferred to the transmission to be adjusted. The transmission controller 154 may be configured to adjust the amount of power transmitted by torque converter lock-up clutch 112 by adjusting the torque converter lock-up clutch in response to various engine operating conditions, or based on a driver-based engine operation request.

Torque converter 106 also includes pump 183 that pressurizes fluid to operate driveline disconnect clutch 136, forward clutch 110, and gear clutches 111. Pump 183 is driven via impeller 185, which rotates at a same speed as electric machine 140.

Automatic transmission 108 includes gear clutches 111 (e.g., gears 1-10) and forward clutch 110. Automatic transmission 108 is a fixed ratio transmission. Alternatively, automatic transmission 108 may be a continuously variable transmission that has a capability of simulating a fixed gear ratio transmission and fixed gear ratios. The gear clutches 111 and the forward clutch 110 may be selectively engaged to change a ratio of an actual total number of turns of input shaft 170 to an actual total number of turns of wheels 116. Gear clutches 111 may be engaged or disengaged via adjusting fluid supplied to the clutches via shift control solenoid valves 109. Power output from the automatic transmission 108 may also be relayed to wheels 116 to propel the vehicle via output shaft 160. Specifically, automatic transmission 108 may transfer an input driving power at the input shaft 170 responsive to a vehicle traveling condition before transmitting an output driving power to the wheels 116. Transmission controller 154 selectively activates or engages torque converter lock-up clutch 112, gear clutches 111, and forward clutch 110. Transmission controller also selectively deactivates or disengages torque converter lock-up clutch 112, gear clutches 111, and forward clutch 110.

A frictional force may be applied to wheels 116 by engaging friction brakes 118. In one example, friction brakes 118 for wheels 116 may be engaged in response to a human driver pressing their foot on a brake pedal (not shown) and/or in response to instructions within brake controller 150. Further, brake controller 150 may apply friction brakes 118 in response to information and/or requests made by vehicle system controller 155. In the same way, a frictional force may be reduced to wheels 116 by disengaging friction brakes 118 in response to the human driver releasing their foot from a brake pedal, brake controller instructions, and/or vehicle system controller instructions and/or information. For example, vehicle brakes may apply a frictional force to wheels 116 via brake controller 150 as part of an automated engine stopping procedure. A braking torque may be determined as a function of brake pedal position.

In response to a request to increase a speed of vehicle 125, vehicle system controller may obtain a driver demand power or power request from a driver demand pedal or other device. Vehicle system controller 155 then allocates a fraction of the requested driver demand power to the engine and the remaining fraction to the electric machine. Vehicle system controller 155 requests the engine power from controller 12 and the electric machine power from electric machine controller 152. If the electric machine power plus the engine power is less than a transmission input power limit (e.g., a threshold value not to be exceeded), the power is delivered to torque converter 106 which then relays at least a fraction of the requested power to transmission input shaft 170. Transmission controller 154 selectively locks torque converter lock-up clutch 112 and engages gears via gear clutches 111 in response to shift schedules and torque converter lock-up clutch lockup schedules that may be based on input shaft power and vehicle speed. In some conditions when it may be desired to charge electric energy storage device 162, a charging power (e.g., a negative electric machine power) may be requested while a non-zero driver demand power is present. Vehicle system controller 155 may request increased engine power to overcome the charging power to meet the driver demand power.

In response to a request to reduce a speed of vehicle 125 and provide regenerative braking, vehicle system controller may provide a negative desired wheel power (e.g., desired or requested powertrain wheel power) based on vehicle speed and brake pedal position. Vehicle system controller 155 then allocates a fraction of the negative desired wheel power to the electric machine 140 and the engine 10. Vehicle system controller may also allocate a portion of the requested braking power to friction brakes 118 (e.g., desired friction brake wheel power). Further, vehicle system controller may notify transmission controller 154 that the vehicle is in regenerative braking mode so that transmission controller 154 shifts gears based on a unique shifting schedule to increase regeneration efficiency. Engine 10 and electric machine 140 may supply a negative power to transmission input shaft 170, but negative power provided by electric machine 140 and engine may be limited by transmission controller 154 which outputs a transmission input shaft negative power limit (e.g., not to be exceeded threshold value). Further, negative power of electric machine 140 may be limited (e.g., constrained to less than a threshold negative threshold power) based on operating conditions of electric energy storage device 162, by vehicle system controller 155, or electric machine controller 152. Any portion of desired negative wheel power that may not be provided by electric machine 140 because of transmission or electric machine limits may be allocated to engine 10 and/or friction brakes 118 so that the desired wheel power is provided by a combination of negative power (e.g., power absorbed) via friction brakes 118, engine 10, and electric machine 140.

Accordingly, power control of the various powertrain components may be supervised by vehicle system controller 155 with local power control for the engine 10, automatic transmission 108, electric machine 140, and friction brakes 118 provided via controller 12, electric machine controller 152, transmission controller 154, and brake controller 150.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 152 may control power output and electrical energy production from electric machine 140 by adjusting current flowing to and from rotor and/or armature windings of electric machine as is known in the art.

Transmission controller 154 receives transmission input shaft position via position sensor 171. Transmission controller 154 may convert transmission input shaft position into input shaft speed via differentiating a signal from position sensor 171 or counting a number of known angular distance pulses over a predetermined time interval. Transmission controller 154 may receive transmission output shaft torque from torque sensor 172. Alternatively, sensor 172 may be a position sensor or torque and position sensors. If sensor 172 is a position sensor, transmission controller 154 may count shaft position pulses over a predetermined time interval to determine transmission output shaft velocity. Transmission controller 154 may also differentiate transmission output shaft velocity to determine transmission output shaft rate of speed change. Transmission controller 154, controller 12, and vehicle system controller 155, may also receive addition transmission information from sensors 177, which may include but are not limited to pump output line pressure sensors, transmission hydraulic pressure sensors (e.g., gear clutch fluid pressure sensors), a transmission fluid temperature sensor, electric machine temperature sensors, gear shift lever sensors, and an ambient temperature sensor. Transmission controller 154 may also receive requested gear input from gear shift selector 190 (e.g., a human/machine interface device). Gear shift selector 190 may include positions for gears 1-N(where N is an upper gear number), D (drive), and P (park).

Brake controller 150 receives wheel speed information via wheel speed sensor 121 and braking requests from vehicle system controller 155. Brake controller 150 may also receive brake pedal position information from position sensor (not shown) in FIG. 1 directly or over CAN 199. Brake controller 150 may provide braking responsive to a wheel power command from vehicle system controller 155. Brake controller 150 may also provide anti-lock and vehicle stability braking to increase vehicle braking and stability. As such, brake controller 150 may provide a wheel power limit (e.g., a threshold negative wheel power not to be exceeded) to the vehicle system controller 155 so that negative electric machine power does not cause the wheel power limit to be exceeded. For example, if brake controller 150 issues a negative wheel power limit of 50 N-m, electric machine power is adjusted to provide less than 50 N-m (e.g., 49 N-m) of negative power at the wheels, including accounting for transmission gearing.

Thus, the system of FIG. 1 provides for a system, comprising: an electric machine; an internal combustion engine; and a controller including executable instructions stored in non-transitory memory that cause the controller to cause rotation of the internal combustion engine at a cold engine idle speed via the electric machine, injecting fuel to a cylinder of the internal combustion engine during a cycle of the cylinder, and combusting the fuel in the internal combustion engine such that indicated mean effective pressure of the cylinder during the cylinder cycle is substantially zero. In a first example, the system includes where injecting fuel to the internal combustion engine includes supplying four separate injections of fuel during the cycle of the cylinder. In a second example that may include the first example, the system includes where supplying four separate injections of fuel includes injecting twice during an expansion stroke of the cycle of the cylinder. In a third example that may include one or both of the first and second examples, the system includes where supplying four separate injections of fuel includes injecting once during an intake stroke of the cycle of the cylinder and injecting once during a compression stroke of the cycle of the cylinder. In a fourth example that may include one or more of the first through third examples, the system further comprises supplying a spark to the cylinder in between injecting twice during the expansion stroke of the cycle of the cylinder. In a fifth example that may include one or more of the first through fourth examples, the system further comprises additional instructions to advance exhaust valve opening into the expansion stroke of the cycle of the cylinder. In a sixth example that may include one or more of the first through fifth examples, the system further comprises a driveline disconnect clutch and additional instructions that cause the driveline disconnect clutch to close to rotate the internal combustion engine.

Referring now to FIG. 2, an example engine operating sequence for a cylinder of an engine during an engine cold start is shown. The engine of FIG. 1 may be operated as shown in FIG. 2 according to the method of FIG. 4. Engine cold starting may be performed when a temperature of the engine is less than a threshold temperature (e.g., less than 27 degrees Celsius). The engine is rotated via an electric machine (not shown in FIG. 2) at a cold engine idle speed (e.g., 1250 RPM) during the sequence of FIG. 2.

The first plot from the top of FIG. 2 is a plot of valve lift profiles versus engine crankshaft angle. The vertical axis represents valve lift amount and the valve lift amount increases in the direction of the vertical axis arrow. The horizontal axis represents engine crankshaft angle and the engine rotates from the left side of the horizontal axis to the right side of the horizontal axis. Solid line 202 represents intake valve lift for the cylinder and dashed line 204 represents exhaust valve lift for the cylinder. Fuel injections are indicated by the fuel injector symbol 250 and sparks are delivered to the cylinder as indicated by asterisks 252.

The second plot from the top of FIG. 2 is a plot of piston position in the engine cylinder versus engine crankshaft angle. The vertical axis represents piston position and the piston moves from bottom-dead-center (BDC) to top-dead-center (TDC). The horizontal axis represents engine crankshaft angle and the engine rotates from the left side of the horizontal axis to the right side of the horizontal axis. Solid line 206 represents piston position within the cylinder.

In this example, engine position is shown beginning at TDC intake stroke of the cylinder at the left hand side of the figure. The exhaust valve is open and the intake valve begins to open shortly after the engine rotates through TDC intake stroke of the cylinder. Intake and exhaust valve overlap occurs and then the exhaust valve fully closes. Before the cylinder reaches bottom-dead-center (BDC) compression stroke, a first fuel injection begins at substantially 30 crank shaft degrees (e.g., 30 crankshaft degrees±30 crankshaft degrees) before BDC compression stroke. During the first fuel injection, substantially 25% (e.g., 25%±10%) of fuel injected during the cylinder cycle into the cylinder is injected in the first injection. This timing and fuel amount allow a homogenous lean mixture to form in the cylinder. Further, since the fuel injection amount is small, there may be less opportunity for the injected fuel to reach cylinder walls and the piston. This may reduce a possibility of wetting cylinder walls and the piston so that fewer hydrocarbons may be ejected from the cylinder during the cylinder's exhaust stroke. The engine rotates through BDC intake stroke.

A second fuel injection begins at substantially 30 crank shaft degrees (e.g., 30 crankshaft degrees±30 crankshaft degrees) after BDC compression stroke. During the second fuel injection, substantially 25% (e.g., 25%±10%) of fuel injected during the cylinder cycle into the cylinder is injected in the first injection. This timing and fuel amount also allows a homogenous lean mixture to form in the cylinder. Further, since the fuel injection amount is small, there may be less opportunity for the injected fuel to reach cylinder walls and the piston. This may reduce a possibility of wetting cylinder walls and the piston so that fewer hydrocarbons may be ejected from the cylinder during the cylinder's exhaust stroke. The engine rotates through the cylinder's compression stroke without combusting fuel that has been injected to the cylinder during this cycle of the cylinder.

Fuel is injected a third time beginning when the cylinder is substantially 50 crankshaft degrees after TDC compression stroke of the cylinder and during the cylinder's expansion stroke (e.g., 50 crankshaft degrees after TDC compression stroke±30 crankshaft degrees). The amount of fuel injected into the cylinder during the third injection is substantially 20% (e.g., 20%±10%) of fuel injected into the cylinder during the cylinder cycle. This timing and fuel amount also allows a rich stratification to occur neat the cylinder's spark plug to increase combustion stability in the cylinder during the cylinder cycle. Additionally, since the fuel injection amount is small, there may be less opportunity for the injected fuel to reach cylinder walls and the piston. This may reduce a possibility of wetting cylinder walls and the piston so that fewer hydrocarbons may be ejected from the cylinder during the cylinder's exhaust stroke.

A spark is introduced to the cylinder during the cylinder cycle at substantially 80 crankshaft degrees before BDC expansion stroke of the cylinder (e.g., 80 crankshaft degrees before BDC expansion stroke±30 crankshaft degrees). By this crankshaft angle, the air-fuel mixture in the cylinder has expanded and the piston is approaching BDC so that combustion of the air-fuel mixture in the cylinder as the engine rotates at cold engine idle speed generates little if any force on the piston. The air-fuel mixture continues to expand as a flame begins to propagate through the cylinder.

The exhaust valve opens at substantially 40 crankshaft degrees before BDC expansion stroke of the cylinder (e.g., 40 crankshaft degrees before BDC expansion stroke±30 crankshaft degrees). By advancing exhaust valve opening, expanding gases and heat are released from the cylinder so that little if any work is done on the piston of the cylinder and a larger amount of heat is released to the exhaust system.

A fourth and final fuel injection for the cylinder cycle begins when the cylinder substantially reaches BDC expansion stroke of the cylinder (e.g., BDC expansion stroke of the cylinder±5 crankshaft degrees). The amount of fuel injected into the cylinder during the fourth injection is substantially 30% (e.g., 30%±10%) of fuel injected into the cylinder during the cylinder cycle. This injected fuel may be ignited in the cylinder and/or in the exhaust system as the open exhaust valve allows gases to escape the cylinder and enter the exhaust system. This timing and fuel amount also allows heat and fuel that has yet to combust, combust in the exhaust system to raise catalyst temperature and lower the catalyst light off time.

Thus, the sequence of FIG. 2 shows how fuel injection timing, fuel injection amount, spark timing, and exhaust timing to increase heat flow to an exhaust catalyst. Further, the fuel injection timing and fuel amounts injected at the specified timings may lower feed gas hydrocarbons that may escape from the cylinder and pass to the tailpipe without being combusted.

Referring now to FIG. 3, example plots of cylinder pressure during cold engine starting and operation are shown. The first plot from the top of FIG. 3 is a plot of cylinder pressure during a cycle of a cylinder that is operated with a prior at method of retarded spark timing. The second plot from the top of FIG. 3 is a plot of cylinder pressure during a cycle of a cylinder that is operated according to the present method. The first and second plots are aligned in engine crankshaft angle.

The first plot from the top of FIG. 3 includes a vertical axis that represents cylinder pressure and cylinder pressure increases in the direction of the vertical axis arrow. The horizontal axis represents engine crankshaft angle and crankshaft angle increases from the left side of the first plot to the right side of the first plot.

The cylinder pressure in the first plot is shown increasing during a compression stroke of the cylinder as the piston moves upward in the cylinder. At TDC compression stroke, cylinder pressure reaches a peak and then it begins to fall off. According to the prior art method, fuel is injected to the cylinder once during the intake or compression stroke. As the pressure is falling in the cylinder, a spark is initiated at crankshaft angle CA1 (e.g., approximately 20 crankshaft degrees after TDC compression stroke). The pressure in the cylinder continues to fall, but then it begins to increase later in the expansion stroke until the exhaust valve is opened. The increasing pressure performs work on the piston and allows the engine to generate torque to rotate the engine. The cylinder operates with a non-zero indicated mean effective cylinder pressure. The cylinder pressure falls after the exhaust valve is opened.

The second plot from the top of FIG. 3 includes a vertical axis that represents cylinder pressure and cylinder pressure increases in the direction of the vertical axis arrow. The horizontal axis represents engine crankshaft angle and crankshaft angle increases from the left side of the second plot to the right side of the second plot.

The cylinder pressure in the second plot is shown increasing during a compression stroke of the cylinder as the piston moves upward in the cylinder. At TDC compression stroke, cylinder pressure reaches a peak and then it begins to fall off. According to the present method, fuel is injected to the cylinder at least three times during the cylinder's cycle. Pressure in the cylinder falls off and follows a pressure that is substantially equivalent (e.g., within ±10% of pressure in a cylinder when no combustion occurs in the cylinder and the engine is rotated at cold engine idle speed) to pressure in the cylinder when combustion is not performed in the cylinder and when the engine is rotated at the same speed. The air-fuel mixture in the cylinder starts to be combusted when a spark is delivered to the cylinder at crankshaft angle CA2. Notice that CA2 is substantially later than CA1 of the prior art method. Also notice that pressure in the cylinder between TDC compression stroke and BDC compression stroke in the second plot is substantially less than pressure in the cylinder at the same crankshaft angles shown in the first plot. The exhaust valve is opened shortly after CA2 in the second plot.

Thus, the cylinder pressure plot in the second plot is comprised of much lower pressures, which indicates that the combusting gases perform little if any work on the piston. Accordingly, much more of fuel injected into the cylinder for the second plot may be applied to heat the exhaust catalyst, thereby reducing tailpipe emissions.

Referring now to FIG. 4, a flowchart of a method for starting and operating a cold engine is shown. The method of FIG. 4 may be at least partially implemented as executable instructions stored in controller memory in the systems of FIG. 1. Further, the method of FIG. 4 may include actions taken in the physical world to transform operating states of the systems of FIG. 1. In addition, in some examples, the method of FIG. 4 may be distributed amongst several controllers where each controller performs a portion of the method.

At 402, method 400 judges whether or not the engine is being or requested to be cold started and/or operating cold. The engine may be judged to be operating cold when a temperature of the engine is less than a threshold temperature (e.g., less than 27 degrees Celsius). The engine may be judged being requested cold started when an operator or automatic driver requests an engine start and a temperature of the engine is less than the threshold temperature. If method 400 judges that the engine is operating cold, being cold started, or requested to be cold started, the answer is yes and method 400 proceeds to 404. Otherwise, the answer is no and method 400 proceeds to 450.

At 450, method 400 operates the engine according to present operating conditions. For example, if the engine is presently running (e.g., rotating and combusting fuel), the engine operates with baseline valve timing, fuel injection timing, and air-fuel ratio. If an engine start is requested and the engine is not being cold started, the engine is started and then operated at a warm idle speed if the vehicle in which the engine resides is in neutral. Spark timing for warm engine starts may be advanced from TDC compression stroke of the cylinder that receives the spark. Method 400 proceeds to exit.

At 404, method 400 rotates the engine at a cold engine idle speed (e.g., 1250 RPM), which is a higher speed than a warm idle speed (e.g., 600 RPM). The engine may be rotated via an electric machine (e.g., 140). A driveline disconnect clutch may be closed to rotate the engine. Method 400 proceeds to 406.

At 406, method 400 retards spark timing for engine cylinders to a spark timing of substantially 100 crankshaft degrees after TDC compression stroke of the cylinder receiving the spark (e.g., 80 crankshaft degrees before BDC expansion stroke±30 crankshaft degrees). By retarding the spark timing this much, less pressure may develop in the cylinder and more hot gas may be expelled from the cylinder. Method 400 proceeds to 408.

At 408, method 400 adjusts exhaust valve timing such that exhaust valves of the engine begin opening at 40 crankshaft degrees before BDC expansion stroke. By opening the exhaust valves earlier, hotter exhaust gases may be directed to the catalyst. Method 400 proceeds to 410.

At 410, method injects fuel at least three times to a cylinder during a cycle of the cylinder. In one example, a first injection in which 50% of fuel injected to the cylinder during the cylinder cycle is injected during the cylinder's intake and/or compression stroke. The first amount of fuel us used to form a homogeneous lean air-fuel mixture in the cylinder. A second fuel injection begins in the cylinder's expansion stroke during the cylinder cycle and 20% of the fuel that is injected to the cylinder during the cylinder cycle is injected. This second injection of fuel generates a stratified fuel cloud near the cylinder's spark plug to increase combustion stability. The second fuel injection is injected at substantially 50 crankshaft degrees after TDC compression stroke of the cylinder during the cylinder cycle. A third fuel injection begins at substantially BDC expansion stroke of the cylinder during the cylinder cycle. The third fuel injection is late during the cycle so that most energy from the third injection operates to heat the exhaust system and catalyst.

In another example, four fuel injections may be supplied to each cylinder as shown in FIG. 2. The first injection in which 25% of fuel injected to the cylinder during the cylinder cycle is injected during the cylinder's intake stroke beginning 30 crankshaft degrees before BDC intake stroke. This small amount of fuel may prevent cylinder and wall wetting by not allowing the fuel spray cone to reach cylinder walls and the piston. The first amount of fuel us used to form a homogeneous lean air-fuel mixture in the cylinder. A second fuel injection in which 25% of fuel injected to the cylinder during the cylinder cycle is injected during the cylinder's compression stroke beginning 30 crankshaft degrees after BDC intake stroke. This small amount of fuel may prevent cylinder and wall wetting by not allowing the fuel spray cone to reach cylinder walls and the piston. A third fuel injection begins in the cylinder's expansion stroke during the cylinder cycle and 20% of the fuel that is injected to the cylinder during the cylinder cycle is injected. This third injection of fuel generates a stratified fuel cloud near the cylinder's spark plug to increase combustion stability. The third fuel injection is injected at substantially 50 crankshaft degrees after TDC compression stroke of the cylinder during the cylinder cycle. A fourth fuel injection begins at substantially BDC expansion stroke of the cylinder during the cylinder cycle. The fourth fuel injection is late during the cycle so that most energy from the fourth injection operates to heat the exhaust system and catalyst. Method 400 proceeds to 412.

At 412, method 400 judges whether or not a temperature of the vehicle's catalyst is greater than a threshold temperature (e.g., a light off temperature). The catalyst temperature may be measured or inferred. If method 400 judges that catalyst temperature is at or above the desired temperature, the answer is yes and method 400 proceeds to 414. Otherwise, the answer is no and method 400 returns to 404.

At 414, method 400 adjusts spark timing, fuel injection timing, and valve timings to nominal or baseline timings. Method 400 also ceases to rotate the engine via the electric machine since the engine is up and running. Method 400 proceeds to exit.

In this way, the method 400 may lower a possibility of cylinder wall wetting and reduce engine hydrocarbon emissions. Further, method 400 may increase an amount of heat energy that is directed to a catalyst and lower an amount of heat energy used to rotate the engine. The fuel injection timings, exhaust valve timing, and spark timings may allow a cylinder to indicate substantially zero (e.g., less than 0.5 bar) indicated mean effective pressure during a cycle of the cylinder so that zero energy from combusting fuel may go into rotating the engine. This may increase heat transfer to the catalyst and reduce catalyst heating time.

The method of FIG. 4 provides for a method for operating an engine, comprising: via a controller, injecting fuel at least three times during a cycle of a cylinder, where two of the at least three times are during an expansion stroke of the cylinder; and via the controller, initiating a spark in the cylinder between the two of the at least three times. In a first example, the method includes where the fuel is injected during a cold engine start. In a second example that may include the first example, the method includes where the cold engine start is when an engine temperature is less than 27 degrees Celsius. In a third example that may include one or both of the first and second examples, the method includes where injecting fuel at least three times includes injecting fuel four times during the cycle of the cylinder. In a fourth example that may include one or more of the first through third examples, the method includes where the fuel is directly injected into a cylinder. In a fifth example that may include one or more of the first through fourth examples, the method further comprises advancing exhaust valve opening into the expansion stroke. In a sixth example that may include one or more of the first through fifth examples, the method includes where during one of the at least three times, fuel is injected while an exhaust valve of the cylinder is open. In a seventh example that may include one or more of the first through sixth examples, the method further comprises rotating the engine at a cold engine idle speed via an electric machine while injecting the fuel at least three times.

The method of FIG. 4 also provides for a method for operating an engine, comprising: via a controller, injecting fuel into a cylinder before top-dead-center compression stroke of the cylinder during a cycle of the cylinder to produce a homogenous air-fuel mixture in the cylinder; via the controller, injecting fuel into the cylinder during an expansion stroke of the cylinder during the cycle of the cylinder to produce a stratified fuel rich cloud around a spark plug; and via the controller, injecting fuel into the cylinder while an exhaust valve of the cylinder is open after injecting the fuel during the expansion stroke. In a first example, the method further comprises generating a spark in the cylinder during the cylinder cycle after injecting fuel during the expansion stroke of the cylinder during the cycle of the cylinder. In a second example that may include the first example, the method includes where injecting fuel before top-dead-center compression stroke of the cylinder includes injecting fuel in two separate injections. In a third example that may include one or both of the first and second examples, the method includes where indicated mean effective pressure in the cylinder during the cylinder cycle is substantially zero. In a fourth example that may include one or more of the first through third examples, the method includes where the exhaust valve is open during the expansion stroke of the cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for operating an engine, comprising:
via a controller, injecting fuel at least three times into a cylinder during a cycle of the cylinder, where two of the at least three times are during an expansion stroke of the cylinder; and
via the controller, initiating a spark in the cylinder between the two of the at least three times.

2. The method of claim 1, where the fuel is injected during a cold engine start.

3. The method of claim 2, where the cold engine start is when an engine temperature is less than 27 degrees Celsius.

4. The method of claim 1, where injecting fuel at least three times includes injecting fuel four times during the cycle of the cylinder.

5. The method of claim 1, where the fuel is directly injected into the cylinder.

6. The method of claim 1, further comprising advancing exhaust valve opening into the expansion stroke.

7. The method of claim 6, where during one of the at least three times, fuel is injected while an exhaust valve of the cylinder is open.

8. The method of claim 1, further comprising rotating the engine at a cold engine idle speed via an electric machine while injecting the fuel at least three times.

9. A system, comprising:
an electric machine;
an internal combustion engine; and
a controller including executable instructions stored in non-transitory memory that cause the controller to cause rotation of the internal combustion engine at a cold engine idle speed via the electric machine, injecting fuel to a cylinder of the internal combustion engine during a cycle of the cylinder, and combusting the fuel in the internal combustion engine such that indicated mean effective pressure of the cylinder during the cycle of the cylinder is less than 0.5 bar.

10. The system of claim 9, where injecting fuel to the internal combustion engine includes supplying four separate injections of fuel during the cycle of the cylinder.

11. The system of claim 10, where supplying four separate injections of fuel includes injecting twice during an expansion stroke of the cycle of the cylinder.

12. The system of claim 11, where supplying four separate injections of fuel includes injecting once during an intake stroke of the cycle of the cylinder and injecting once during a compression stroke of the cycle of the cylinder.

13. The system of claim 12, further comprising supplying a spark to the cylinder in between injecting twice during the expansion stroke of the cycle of the cylinder.

14. The system of claim 13, further comprising additional instructions to advance exhaust valve opening into the expansion stroke of the cycle of the cylinder.

15. The system of claim 9, further comprising a driveline disconnect clutch and additional instructions that cause the driveline disconnect clutch to close to rotate the internal combustion engine.

16. A method for operating an engine, comprising:
via a controller, injecting fuel into a cylinder before top-dead-center compression stroke of the cylinder during a cycle of the cylinder to produce a homogenous air-fuel mixture in the cylinder;
via the controller, injecting fuel into the cylinder during an expansion stroke of the cylinder during the cycle of the cylinder to produce a stratified fuel rich cloud around a spark plug; and
via the controller, injecting fuel into the cylinder while an exhaust valve of the cylinder is open after injecting the fuel during the expansion stroke.

17. The method of claim 16, further comprising generating a spark in the cylinder during the cycle of the cylinder after injecting fuel during the expansion stroke of the cylinder during the cycle of the cylinder.

18. The method of claim 16, where injecting fuel before top-dead-center compression stroke of the cylinder includes injecting fuel in two separate injections.

19. The method of claim 16, where indicated mean effective pressure in the cylinder during the cycle of the cylinder is substantially zero.

20. The method of claim 16, where the exhaust valve is open during the expansion stroke of the cylinder.

* * * * *